O. STITT.
SAFETY DRIVE FOR HARVESTER REELS.
APPLICATION FILED JULY 9, 1917.
1,350,043. Patented Aug. 17, 1920.
2 SHEETS—SHEET 2.
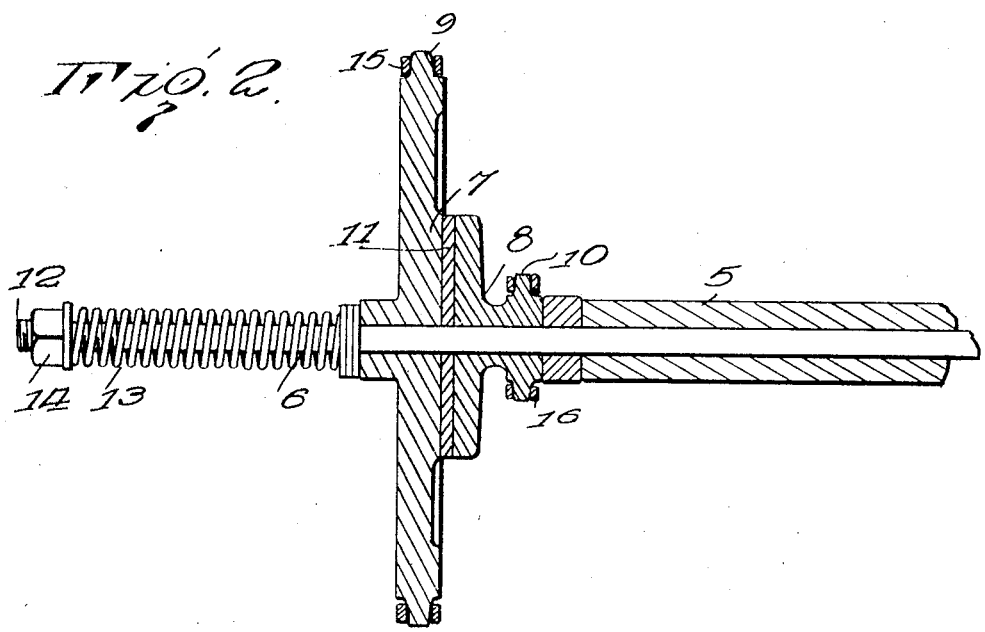
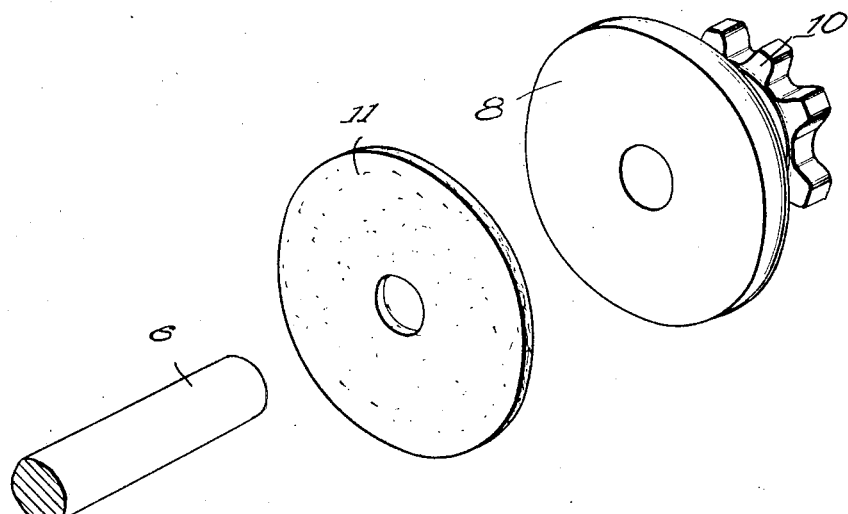
Orlando Stitt
Inventor
By Geo. P. Kimmel
Attorney

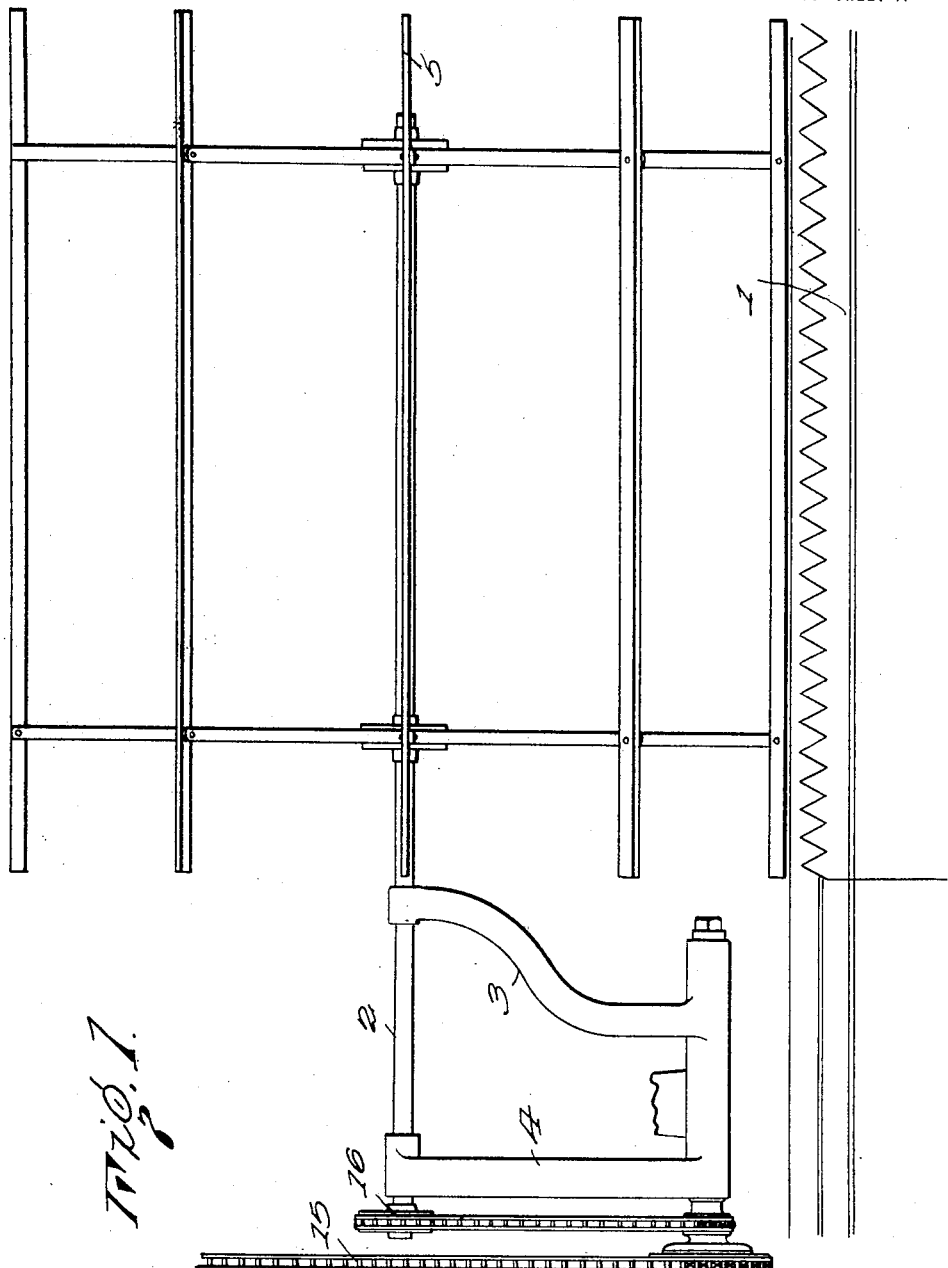

UNITED STATES PATENT OFFICE.

ORLANDO STITT, OF TOLEDO, ILLINOIS.

SAFETY-DRIVE FOR HARVESTER-REELS.

1,350,043.	Specification of Letters Patent.	Patented Aug. 17, 1920.

Application filed July 9, 1917. Serial No. 179,517.

*To all whom it may concern:*

Be it known that I, ORLANDO STITT, a citizen of the United States, and resident of Toledo, in the county of Cumberland and State of Illinois, have invented certain new and useful Improvements in Safety-Drives for Harvester-Reels, of which the following is a specification.

This invention relates to harvesting machines and has more especial reference to an improved drive for the reel thereof.

The invention has for its dominant object to provide a safety drive for harvesting machine reels which will allow the reel to stop, should the same engage a rock or other substance during the travel of the harvesting machine over a field, thus, preventing the breaking of the reel or the fracturing of the drive transmission.

Among other aims and objects of the invention may be mentioned, the provision of a drive of the character mentioned with a view to compactness, and in which the number of parts are few, the construction simple, the cost of production small, and efficiency and operation high.

The foregoing together with additional advantageous details and arrangements of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Figure 1 is a top plan of the harvesting machine reel with my improved drive applied thereto;

Fig. 2 is a section through the safety clutch of the drive; and

Fig. 3 is a disassembled perspective thereof.

Similar characters of reference refer to similar parts throughout the several views of the drawings.

Having more particular reference to the drawings, I have fragmentally fully shown and designated in its entirety the harvesting machine and mowing mechanism by the numeral 1. Directly forward of the mowing mechanism and supported upon a driven shaft 2 journaled in the bearings 3 and 4 is a conventional type of reel 5. Other bearings are formed in the elements 3 and 4 and have journaled therein a stub-shaft 6 carrying frictional clutch elements 7 and 8 thereon, the said elements having sprocket wheels 9 and 10, formed thereon, one face of one of the said clutch elements carrying a fiber disk 11 thereon, formed of leather or like material. It is to be noted, that the outer end of the stub-shaft 6 is extended and screw threaded as at 12; an expansible coiled spring 13 being arranged thereon and having bearing upon the adjacent face of the sprocket wheel 9, and upon a nut 14 turned into engagement with the said screw threaded extremity. Thus, it will be appreciated that the adjacent faces of the frictional clutch elements 7 and 8 will be normally held in contact.

Extending about the sprocket wheel 9 is a power transmitting sprocket chain 15, which chain is engaged with a suitable source of power, not shown. A similar sprocket chain is arranged about the sprocket wheel 10 and extends into engagement with a sprocket wheel 16 carried upon the outer extremity of the driven shaft 2. By so connecting the shafts 2 and 6, it will be understood that rotary motion will be imparted to the reel 5 under normal conditions, the stub-shaft 6 serving in the capacity of a driving shaft.

In operation, should any one of the blades of the reel 5 engage a rock or other substance during movement of the harvesting machine over a field the same will be permitted to stop due to the provision of the frictional clutch elements 7 and 8. Thus, breaking of the reel or its blades or the driving means for the reel is eliminated and considerable trouble and expense avoided by the operator. To vary the engagement of the clutch elements 7 and 8 the tension of the coiled spring 13 is adjusted by means of the bearing nut 14.

Manifestly, the construction shown is capable of considerable modification and such modification as is within the scope of my claim, I consider within the spirit of my invention.

I claim:—

The combination with a driven shaft, of a bracket therefor, a second shaft carried in the bracket, and spaced from the driven shaft, a sprocket wheel fixed to the driven shaft, large and small sprocket wheels loose on the second shaft, a friction clutch disk formed on one of the loose sprocket wheels, the other loose sprocket wheel being formed with a friction face to be engaged by the friction clutch disk, a sprocket chain trained over the large sprocket wheel, an endless sprocket chain trained over the smaller sprocket wheel and over the sprocket wheel fixed to the driven shaft, and a coiled expansion spring carried by the second shaft and active against the loose sprocket wheel adjacent thereto for frictionally holding the clutch disk in positive engagement with the clutch face.

In testimony whereof I affix my signature hereto.

ORLANDO STITT.